United States Patent
Suman

(10) Patent No.: US 9,453,611 B2
(45) Date of Patent: Sep. 27, 2016

(54) PROPANE TANK CONTINUOUS MONITORING SYSTEM

(71) Applicant: Shailendra K Suman, Matthews, NC (US)

(72) Inventor: Shailendra K Suman, Matthews, NC (US)

(*) Notice: Subject to any disclaimer, the term of this patent is extended or adjusted under 35 U.S.C. 154(b) by 411 days.

(21) Appl. No.: 13/922,217

(22) Filed: Jun. 19, 2013

(65) Prior Publication Data

US 2014/0375469 A1    Dec. 25, 2014

(51) Int. Cl.
*F17C 13/02*    (2006.01)
*G08C 17/02*    (2006.01)
*H04Q 9/00*    (2006.01)

(52) U.S. Cl.
CPC ............... *F17C 13/028* (2013.01); *H04Q 9/00* (2013.01)

(58) Field of Classification Search
CPC ..... F17C 13/028; G08C 17/02; G08C 17/04; G01F 23/20; A47J 37/0786; G01G 23/3735; G01G 3/1412; H04Q 9/00; A61B 5/0002; G01D 4/002
USPC ........... 340/870.01; 177/1, 210 R; 126/25 R; 73/296
See application file for complete search history.

(56) References Cited

U.S. PATENT DOCUMENTS

| | | | |
|---|---|---|---|
| 2005/0088307 A1* | 4/2005 | Schaffer et al. | 340/612 |
| 2005/0247123 A1* | 11/2005 | Fuse | 73/290 R |
| 2007/0163568 A1* | 7/2007 | Murray et al. | 126/50 |
| 2007/0261894 A1* | 11/2007 | Harish | 177/211 |
| 2009/0005930 A1* | 1/2009 | Koebrick | 701/36 |
| 2009/0025474 A1* | 1/2009 | Lagergren | 73/290 V |
| 2009/0057036 A1* | 3/2009 | Oxocelhay | 177/25.14 |
| 2010/0256930 A1* | 10/2010 | Wolford et al. | 702/51 |
| 2011/0174551 A1* | 7/2011 | Lucas et al. | 177/1 |

FOREIGN PATENT DOCUMENTS

WO    WO 2009128081 A1 * 10/2009

* cited by examiner

*Primary Examiner* — Sisay Yacob

(57) ABSTRACT

An apparatus, system and method for measuring quantity of a material are disclosed. One or more sensors are used to measure the quantity of the material are measured and error causing parameters are also measured. Error causing parameters are processed by executing one or more correction methodologies to determine a correction output. The quantity of the material is measured by using the correction output. One or values associated with the quantity of the material are measured and displayed. The one or more values are transmitted to a server and informative messages are received from the server.

5 Claims, 9 Drawing Sheets

PROPANE TANK CONTINUOUS MONITORING SYSTEM

The present application claims the benefit of priority of U.S. Provisional Patent Application No. 61/661,766, entitled "PROPANE TANK CONTINUOUS MONITORING SYSTEM", and filed Jun. 19, 2012, the entirety of which is hereby incorporated by reference herein for all purposes.

BACKGROUND

These days lot of scales are developed to measure quantity of many types of materials including cooking gas or any other fuel. The cooking and industrial gases stored in cylinders/tanks/bottles/canisters which are commonly used for cooking, heating, barbequing, lighting, and other commercial use are currently fitted with inline gas pressure sensors to monitor and assess the quantity of gas left. However, while measuring the quantity of material or fuel, so many errors are observed due to which there comes a variance in actual measurement. Also, management of fuel has to be done manually by submitting request for refilling by regularly checking the fuel quantity etc.

Currently it is difficult to ascertain the amount of Gas received and the amount remaining in a cylinder at any point of time. Typically, an exchange of a used cylinder for a full one has to be booked in advance, e.g., with an Oil/Gas company or their dealer. To avoid premature or late exchanges, it would be useful to accurately know the amount of Gas remaining in a cylinder, and to be able to predict when a new cylinder would be required.

In the conventional systems and methods, the scale can share various data such as weight information or data; battery status etc. in digital format to various wired or wireless devices uniquely or on standard communication formats. However, the sharing of data requires large bandwidth. Also, there is no system to assist remotely in the management of material in a container by generating automatic requests.

Therefore, a system and method capable of considering errors while measuring the quantity of material and also capable of exchanging data in an economic way would be needed.

SUMMARY

Various embodiments provide an apparatus for measuring quantity of a material. The apparatus comprises a load bearing platform to hold a container storing the material and at least one sensor coupled to the load bearing platform, configured to measure the quantity of the material and one or more error causing parameters. The apparatus further comprises a processor in communication with the sensors, coupled to a memory. The processor configured to determine an effect of the error causing parameters while measuring the quantity of the material by executing one or more modules stored in the memory. The one or more modules further comprises a correction module configured to execute one or more correction methodology with respect to the error causing parameters so measured, to determine a correction output, the correction methodology determines a variance caused due to the error causing parameter in the measurement of the quantity of the material. The apparatus further comprises a measurement device configured to measure periodically one or more values associated with the quantity of the material by using the correction output and an output device configured to display one or more values associated with the quantity of the material and to generate a notification for a user in a customized manner.

Various embodiments further discloses a system for measuring a quantity of a material, the quantity of the material is further communicated to a server in a network. The system comprises a load bearing platform to hold a container storing the material and at least one sensor coupled to the load bearing platform, configured to measure the quantity of the material and one or more error causing parameters in the measurement of the quantity of the material. The system further comprises a processor in communication with at the sensors and coupled to a memory. The processor configured to determine an effect of the error causing parameters while measuring the quantity of the material by executing one or more modules stored in the memory. The one or more modules further comprises a correction module configured to execute one or more correction methodology with respect to the error causing parameters to determine a correction output, the correction methodology determines a variance caused due to the error causing parameter in the measurement of the quantity of the material. The system further comprises a measurement device configured to measure periodically one or more values associated with the quantity of the material by using the correction output and a transceiver configured to transmit the values associated with the quantity of the material to the server in the network. The transceiver is further configured to receive one or more informative message from the server with respect to the values transmitted to the server, such that the informative message provide assistance in management of the material in the container. The system further comprises an output device configured to display one or more values associated with the material and the informative message to generate a notification for a user in a customized manner.

DETAILED DESCRIPTION

Apparatus, systems and methods for measuring quantity of a material are described. The apparatus and system are provided with a load bearing platform such as weighing scale to hold a container storing the material. The load bearing platform facilitates in measuring quantity of the material such as fuel, the fuel may include Propane or LPG (Liquefied Petroleum Gas). The weighing scale compensates for one or more error causing parameters in the weighing scale caused due to creep value, zero balance factor, temperature factor, tank variance factor, etc.

The errors are compensated using an appropriate correction methodology in order to determine a correction output. The correction methodology considers the variance caused due to the error causing parameter and compensates for the error and shows an exact measurement of quantity of the material in the container. The values with respect to the quantity of the material may be displayed on a display device. Further, the values may be transmitted to a server using any of the communication channels with communication devices.

While aspects of described apparatus, system and method for measuring quantity of a material may be implemented in any number of different computing systems, environments, and/or configurations, the embodiments are described in the context of the following exemplary system.

Figure 1:
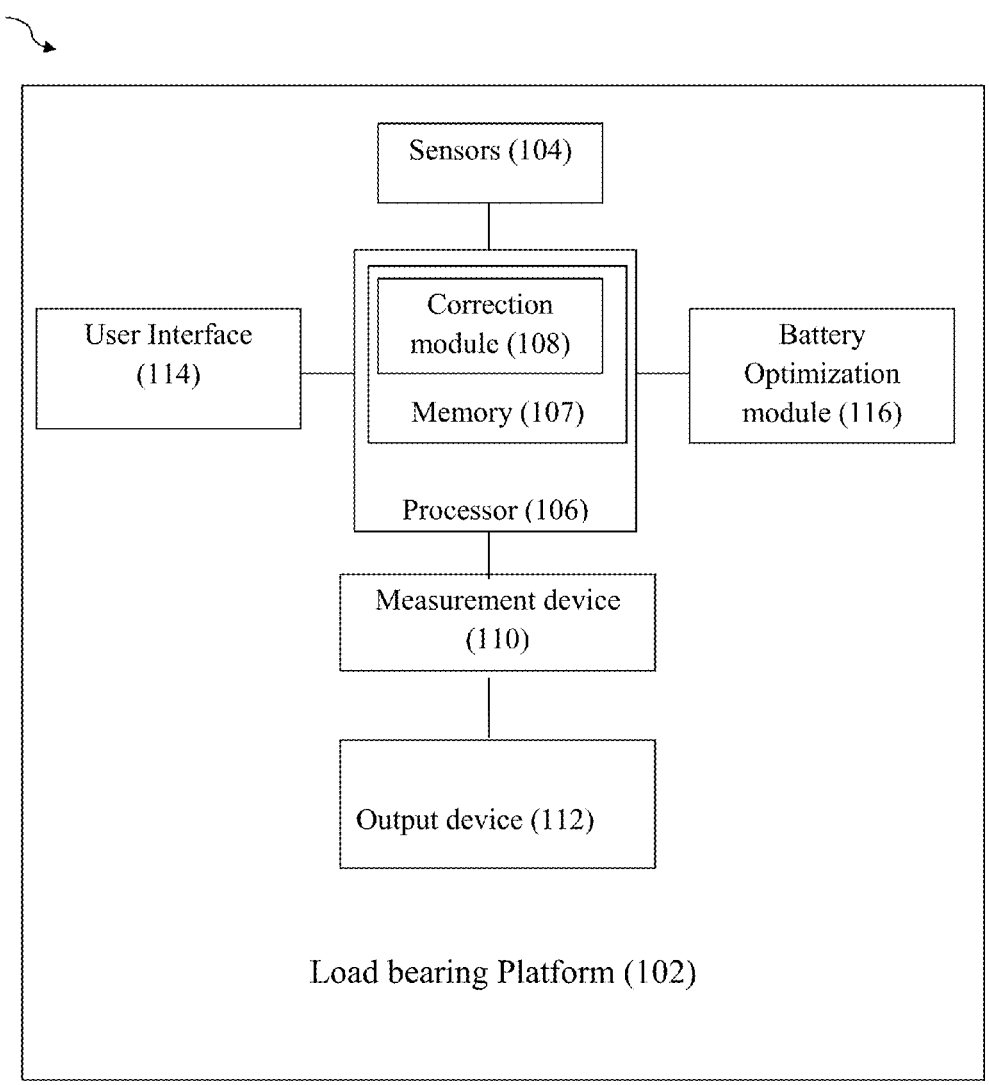
FIG. 1 illustrates an apparatus for measuring quantity of a material in accordance with some embodiments.

Referring to FIG. 1, an apparatus 100 comprises a load bearing platform 102. The load bearing platform supports sensors 104 and a processor 106 coupled to a memory 107. The memory stores a correction module 108. The apparatus further comprises a measurement device 110 and an output device 112. The apparatus further comprises a user interface 114 and a battery optimization module 116.

Figure 2A:
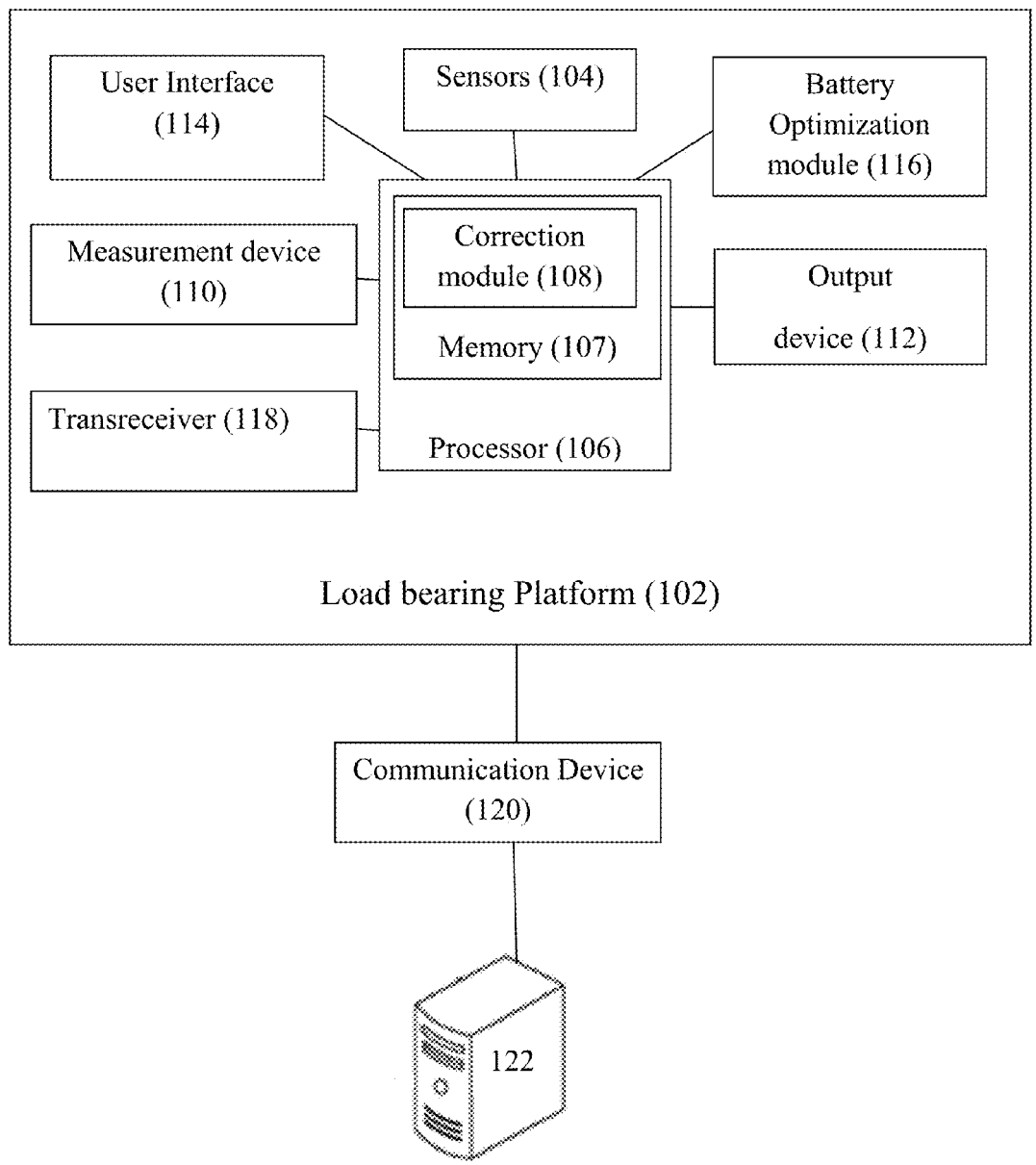
FIG. 2(a) illustrates system architecture for measuring quantity of the material and sharing the quantity with a server in accordance with some embodiments.
Figure 2B:
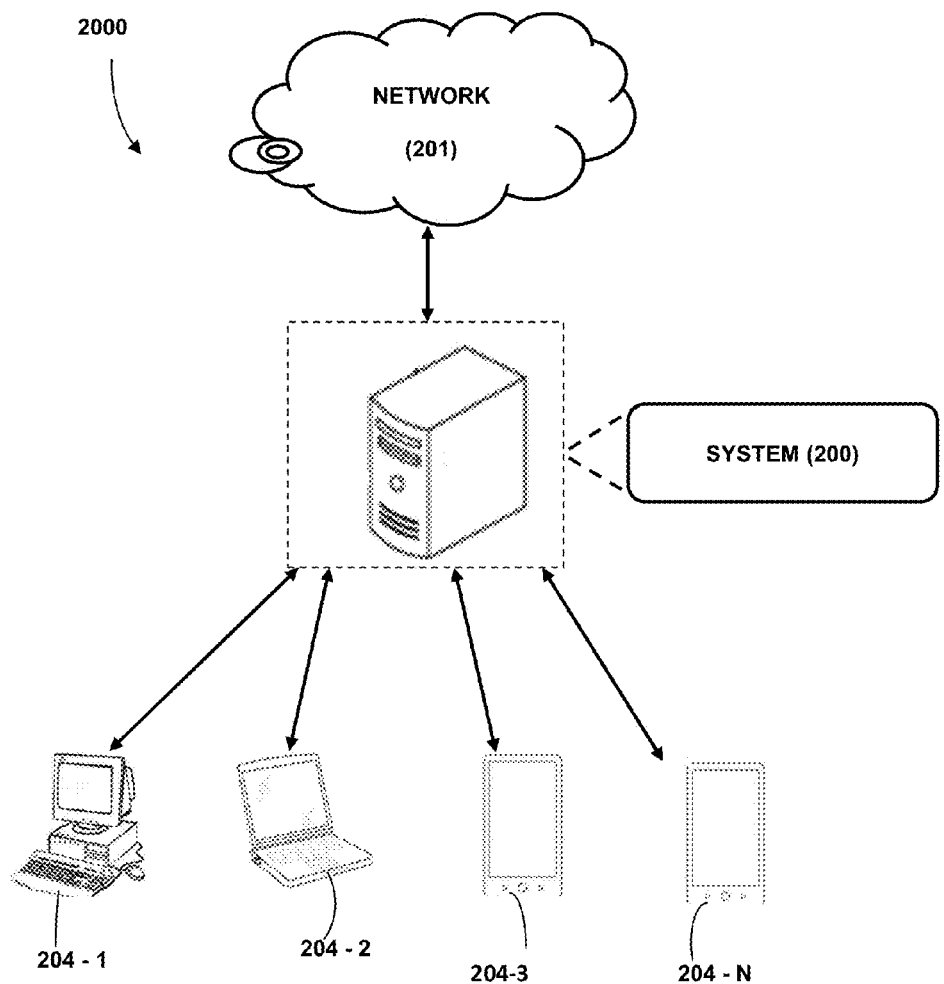
FIG. 2(b) illustrates the distributed architecture of the system for measuring quantity of the material in accordance with some embodiments.
Figure 2C:
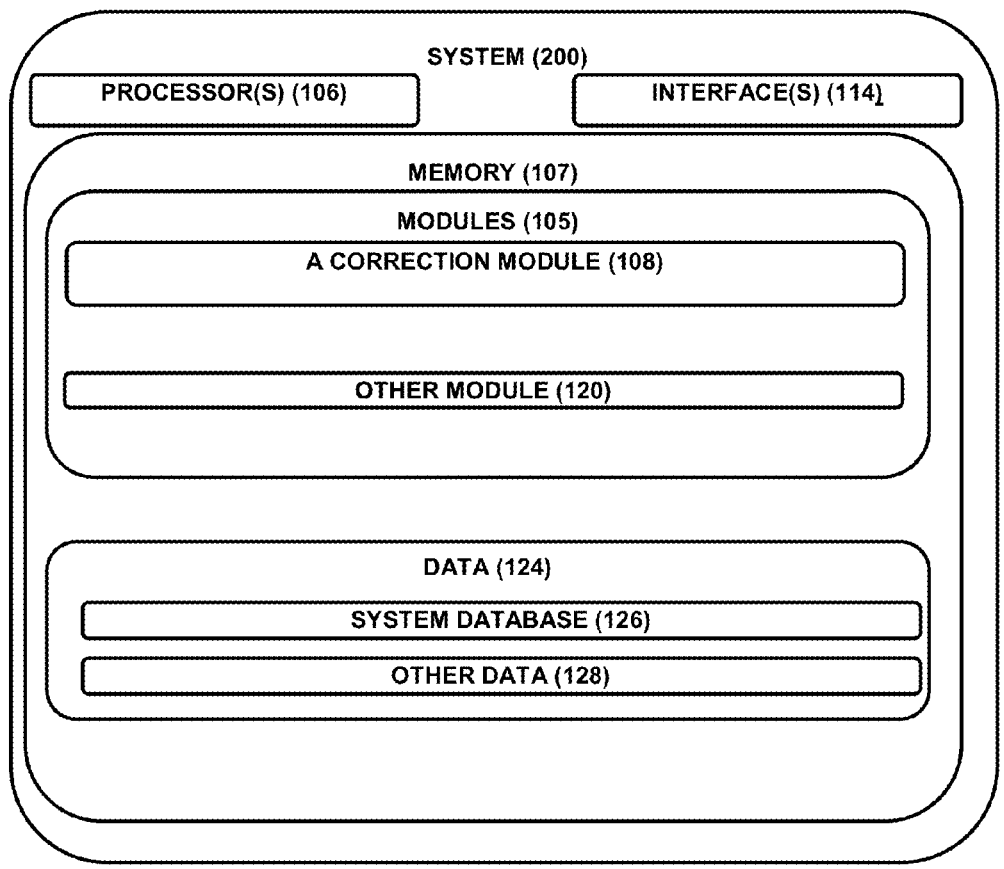
FIG. 2(c) illustrates the system modules for measuring the quantity of the material in accordance with some embodiments.

Referring now to FIGS. 2(a), 2(b) and 2(c), a network implementation 2000 of a system 200 for measuring a quantity of a material and communicating the quantity of the material to a server is illustrated, in accordance with an embodiment of the present subject matter. In one embodiment, the system 200 provides a measurement of the quantity of the fluid by considering one or more error causing parameters. These error causing parameters are compensated by using one or more correction methodology. The values with respect to the quantity of the material are then measured and communicated to the server. The server further transmits an informative message to the system 200. The informative message provides assistance in management of the material inside the container.

Although the present subject matter is explained by considering a scenario that the system 200 is implemented as an application on a server. It may be understood that the system 200 may also be implemented in a variety of computing systems, such as a laptop computer, a desktop computer, a notebook, a workstation, a mainframe computer, a server, a network server, and the like. It will be understood that the system 200 may be accessed by multiple users through one or more user devices 204-1, 204-2 . . . 204-N, collectively referred to as user 204 hereinafter, or applications residing on the user devices 204. Examples of the user devices 204 may include, but are not limited to, a portable computer, a personal digital assistant, a handheld device, and a workstation. The user devices 204 are communicatively coupled to the system 200 through a network 201.

In one implementation, the network 201 may be a wireless network, a wired network or a combination thereof. The network 201 can be implemented as one of the different types of networks, such as intranet, local area network (LAN), wide area network (WAN), the internet, and the like. The network 201 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Referring now to FIG. 2(c), the system 200 is illustrated in accordance with an embodiment of the present subject matter. In one embodiment, the system 200 may include at least one processor 106, an input/output (I/O) interface 114, and a memory 107. The at least one processor 106 may be implemented as one or more microprocessors, microcomputers, microcontrollers, digital signal processors, central processing units, state machines, logic circuitries, and/or any devices that manipulate signals based on operational instructions. Among other capabilities, the at least one processor 106 is configured to fetch and execute computer-readable instructions stored in the memory 107.

The I/O interface 114 may include a variety of software and hardware interfaces, for example, a web interface, a graphical user interface, and the like. The I/O interface 114 may allow the system 200 to interact with a user directly or through the client devices 104. Further, the I/O interface 114 may enable the system 200 to communicate with other computing devices, such as web servers and external data servers (not shown). The I/O interface 114 can facilitate multiple communications within a wide variety of networks and protocol types, including wired networks, for example, LAN, cable, etc., and wireless networks, such as WLAN, cellular, or satellite. The I/O interface 214 may include one or more ports for connecting a number of devices to one another or to another server.

The memory 107 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 107 may include modules 105 and data 124.

The modules 105 include routines, programs, objects, components, data structures, etc., which perform particular tasks or implement particular abstract data types. In one implementation, the modules 105 may include a correction module 108 and other modules 120. The other modules 120 may include programs or coded instructions that supplement applications and functions of the system 200.

The data 124, amongst other things, serves as a repository for storing data processed, received, and generated by one or more of the modules 120. The data 124 may also include a system database 126 and other data 128.

Figure 7:
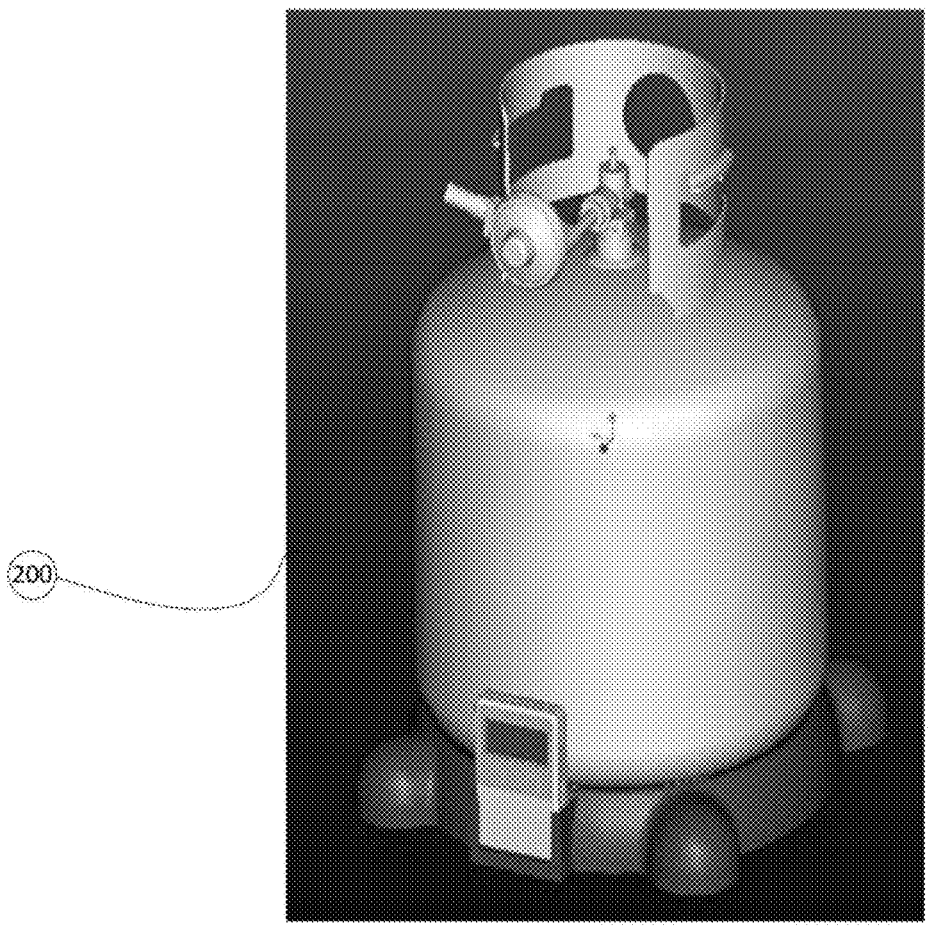
FIG. 7 illustrates a means of holding the container string the material in accordance with some embodiments.

In one embodiment, as illustrated in FIG. 1, in the apparatus 100, the load bearing platform 102 holds a container storing the material. The load bearing platform 102 may include a weighing scale. Further, the apparatus 100 may comprise a trolley (FIG. 7) coupled to the load bearing platform 102. The trolley may serve as a holder, seater, etc. The trolley may hold the container storing the material over long period of time. The trolley may facilitate in moving the load bearing platform one place to another in domestic homes or any other areas.

In one embodiment, the load bearing platform 102 may be placed on a spring member. The load bearing platform 102 may be coupled to a dial marked with an indicator to determined quantity. The load bearing platform 102 may be coupled to the dial using one or more gears, and/or one or more mechanisms for translating linear displacement into angular displacement. With the coupling, displacement in the load bearing platform 102 due to the quantity of the material it may cause the dial to turn by a certain angular amount. If the dial is accurately calibrated to the spring, then the indicator showing through the viewing window corresponds to the quantity of the material.

In one embodiment, the load bearing platform 102 comprises a lever, a gear assembly, or other means to step down the force placed by the quantity on the spring. For example, one end of a lever arm may be at a fulcrum, the other end of the lever arm may be coupled to the spring, and the quantity of the material may be delivered to a point on the lever arm between the two ends. With this, the force of the material is stepped down, with the force reduction greater the closer the quantity of the material is delivered to the fulcrum. In another embodiment, the load bearing platform 102 comprises one or more electronic sensing mechanisms. The quantity of the material may be directed onto a component having electrical properties that changes based on quantity or force applied. The electrical properties may include resistance, conductivity, capacitance, inductance, direction of conductivity, impedance, impedance at certain frequencies, voltage, charge gradient, etc. For example, components may include a load cell, a strain gauge load cell, a hydraulic load cell, piezoelectric load cell, vibrating wire load cell, capacitive load cell, etc.

In one embodiment, the quantity and/or force may be electrically coupled to one or more other electrical components. The components when combined may form a circuit. The circuit may provide an output reading (e.g., a voltage; e.g., a current), which may vary in a known or deterministic way with the quantity of the material placed on the load bearing platform.

In one embodiment, the load bearing platform 102 may include one or more buttons. The buttons may contain various indications or markings in various shapes, colors and sizes, and may be placed in various arrangements. In another embodiment, the buttons are colored for easy identification. Buttons may be electrically and/or mechanically coupled to internal electronics of the load bearing platform 102, such as to an embedded processor 106, and as such may provide signals to internal electronics.

In one embodiment, the load bearing platform 102 may comprise a reset button. For example, the reset button may be marked "RESET". The reset button may be colored red. In operation, the user may press the reset button once before the placement of a new container on the load bearing platform. The reset button may erase prior data, such as prior quantity measurements of partially filled or empty containers.

In one embodiment, the load bearing platform may comprise on/off button. The on/off button may be marked "ON/OFF", for example. The on/off button may be the color orange. The on/off button may be used, for example, to power off the load bearing platform 102 when not in use, so as to save energy and/or battery life.

In one embodiment, the load bearing platform comprises a % button, when pressed, causes the load bearing platform to show one or more material quantity in percentage, material quantity in kgs, material quantity in lbs, and graphic display of a container with the quantity of material left in the container. As will be appreciated, in various embodiments, the display may show various other messages or similar messages in different forms. For example, the display may show a weight in ounces, a volume remaining, and estimated amount of equivalent barbeque time remaining from the stored material and so on. The % button may be marked "GAS", or may have any other suitable marking.

The % button may be colored green, or any other suitable color. In other embodiments, the electronics contained within the load bearing platform may be powered by a CR 2032 button cell. The CR 2032 button cell may be sufficient to power the load bearing quantity for up to a year. In another embodiment; other sources of power may also be used.

Figure 3:
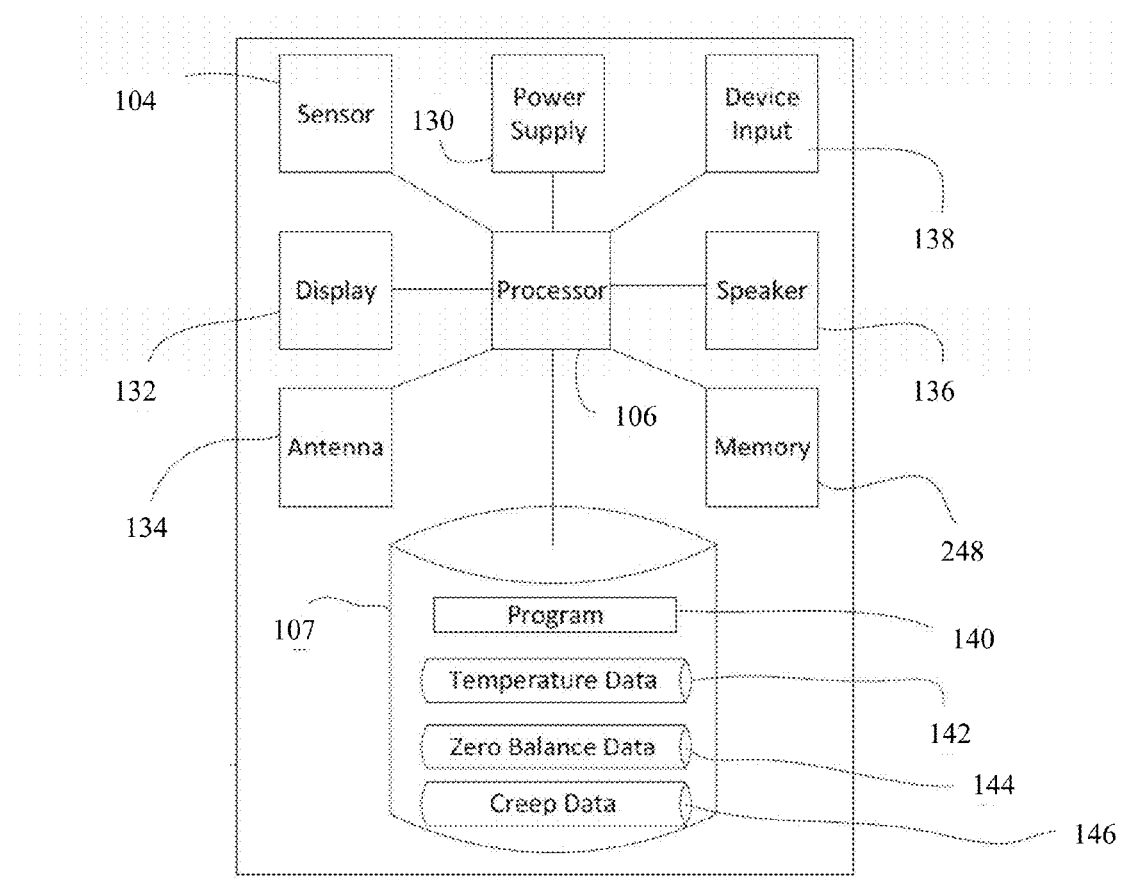
FIG. 3 illustrates a mechanism of measuring quantity of the material in accordance with some embodiments.

In one embodiment, referring to FIG. 3, the apparatus 100 comprises the sensor 104 coupled to the load bearing platform 102. The sensor 104 may also be located inside the load bearing platform 102. The sensor 102 may be configured to measure the quantity of the material and one or more error causing parameters. The processor 106 in communication with the sensors is configured to determine an effect of the error causing parameters while measuring the quantity of the material by executing one or more modules stored in the memory 107. The sensors 104 used to measure the quantity of the material may comprise load sensor, pressure sensor, motion sensors, accelerometers, gyroscopes, location sensor, vibration sensor, or a combination thereof. It is apparent to those skilled in the art to use more or fewer load sensors and that mechanical load sensor or other types of load sensors to measure the quantity of the material.

In one embodiment, the modules may comprise the correction module (108) stored in the memory 107, configured to execute one or more correction methodology with respect to the error causing parameters so measured in order to determine a correction output. The correction methodology determines a variance caused due to the error causing parameter in the measurement of the quantity of the material. The correction module 108 compensates for the error causing parameters such as creep, zero balance, and temperature and cylinder variance. The execution of the correction module with respect to the error causing parameter is presented below.

Measurement of Creep Value as the Error Causing Parameter

The error may be caused due to creep in the container material due to prolonged stress and may be due to high temperatures. Creep may cause the container materials to gradually deform and may not allow the container to regain its original shape. In the load bearing platform 102, the deformation may lead to change in the values of the quantity of the fuel while measuring, thereby presenting inaccurate measurement of quantity of the material when the errors are not compensated. Further, the cause for creep may be due to the usage of the container for prolonged period of time.

In one embodiment, the correction module 108 compensates for creep based on the creep stability after a given period of time. For example, when a new container is placed on the load bearing platform, the quantity of the material may be measured at predefined intervals. Further, the correction module 108 may determine trend in the measurement of quantity of the material and may interpolate final creep value after predefined period of time. In another embodiment, the measurement of the quantity of the material may be taken periodically until there is no longer any change is required in the measurement. In such scenarios, the creep adjustment may be determined based on difference between initial quantity of the material and the quantity of the material after the creep is stabilized.

Measurement of Zero Balance Value as the Error Causing Parameter

In one embodiment, the apparatus 100 may continuously monitor the quantity of the container. Further, the load bearing platform 102 may not have to calibrate before providing measurement. In other embodiment, the load bearing platform 102 may not calibrate to zero load before providing measurement. In order to provide accurate measurement, the providing measurement may store calibration values due to scenarios: (1) at factory during zero load calibration process; (2) at user location during a zero load instance.

The load bearing platform 102 may also be calibrated at various temperatures. The values of the sensor output and temperature may be stored in the memory 107. The data stored in the memory 107 may be retrieved at later stage for calculating the actual quantity of the material. For example, the load bearing platform 102 may use calibrated data stored earlier in order to adjust measured quantity of the material in view of the temperature. In other embodiment, the user may temporarily remove the quantity of the container from the load bearing platform 102 to calibrate the load bearing platform 102 without any load. The user may calibrate the load bearing platform 102 by tapping the load bearing platform, for example, by setting the load bearing platform 102 a set period of time (e.g., 5 seconds) to calibrate.

Measurement of Temperature Value as the Error Causing Parameter

In one embodiment, temperature may bring change in the measured quantity of the material. The load bearing platform 102 may be not recalibrated before measuring such that the effect of temperature may be compensated by the correction module 108. The load bearing platform 102 may comprise an inbuilt thermometer, temperature sensor, or the like. Further, the load bearing platform 102 may receive external temperature measurements via a wirelessly coupled thermometer or via a weather data feed.

For example, the load sensor may comprise temperature characteristic: 0.25 (% F.S/10 C). The correction module 108 compensates the measured quantity based on predefined constant, factor, and the factors dependent on temperature, and factors dependent on the quantity.

In one embodiment, the temperature effect on the measurement may be compensated: (1) at the time of factory calibration or zero load instance calibration, the temperature may be stored in non-volatile memory; (2) at the time of measuring quantity, the temperature is may also be measured; (3) measured load quantity may be adjusted by 0.25*% F.S*(Current Temperature–Calibration Temperature)/10.

As will be appreciated, other methods of measuring temperature and compensating for temperature in a quantity measurement may be used. Further, various processes that measure temperature, in conjunction with the quantity and uses any correction methodology to adjust the effect of temperature is well understood by those persons skilled in the art.

Measurement of Tank Variance Value as the Error Causing Parameter

In one embodiment, the correction module 108 may be used to account for material tank variance. For example, suppose there are two types of gas tanks available weighing 18 lbs and 16.7 lbs respectively. It may be desirable for the correction module 108 to avoid presenting a false positive, i.e., the correction module 108 may avoid indicating that the gas in the container when there is no gas left in the container. In order to overcome such scenario, the correction module 108 may implement the following methodology:

(1) factory default assumes that container minimum quantity is 18 lbs.
(2) the quantity is used for calculating percent and time remaining.
(3) when the container reaches calculated minimum, the display is 0%/0 minutes.
(4) the minimum container quantity is continuously recorded at 1 minute intervals
(5) the new minimum quantity is stored in memory if it stays the same for 5 measurements and if it is lower than the current stored minimum
(6) the new tank maximum quantity is calculated, which is calculated at minimum plus 15 lbs
(7) the new recorded minimum quantity is used in all new calculations;
(8) stored maximum quantity is compared with actual quantity when container is replaced—if measured maximum is larger than recorded then restore minimum container maximum container values back to factory default (18 lbs and 33 lbs) back to 18 lbs and maximum container quantity back to 33 lbs if maximum quantity.

In one embodiment, the apparatus 100 further comprises the measurement device 110 communicating with the processor 106 and is configured to measure periodically one or more values associated with the quantity of the material by using the correction output. The measurement device 110 further comprises one or more electronic components to convert electrical signals into weight of the material. The electronic components is selected from a group of a load cell, a strain gauge load cell, a hydraulic load cell, piezoelectric load cell, vibrating wire load cell, pressure gauge or a capacitive load cell. The electrical properties may include resistance, conductivity, capacitance, inductance, direction of conductivity, impedance, impedance at certain frequencies, voltage, charge gradient, etc.

In one embodiment, the apparatus 100 further comprises the output device 112 configured to display one or more values associated with the quantity of the material and to generate a notification for a user in a customized manner. As will be appreciated, in various embodiments, the display working as an output device 112 may show various other messages or similar messages in different forms. For example, the display may show a weight in ounces, a volume remaining, and estimated amount of equivalent barbeque time remaining from the stored material and so on. The output device may be a liquid crystal display (LCD), electronic ink (e-ink) display, or any other type of display.

The values associated with quantity of the material that may be displayed comprises weight readings of the material, estimates of an amount of material remaining, a material weight in percentage, a material weight in kgs, material quantity in lbs. The output device 112 further displays one or more values in a form of a graphical representation to further generate notification in a form of an alarm or any light display, or a combination thereof.

In one embodiment, the output device 112 may be connected to the load bearing platform 102 via a wire, cable, Ethernet cable, or any other means of communication. In one embodiment, the load bearing platform 102 may communicate with the display wirelessly, e.g., via Bluetooth, Wi-Fi, or any other protocol. The output device 112 may also be present inside the load bearing platform 102.

Battery Life Optimization

In one embodiment, optimization of the battery life of the one or more components used in the apparatus 100 is done by means of the battery optimization module 116. The components present the apparatus 100 may be set into sleep mode at the times when the measurements are taken periodically or when the user presses the button. The sleep mode may include mode of reduced power consumption where less or minimal circuitry is used, or when particularly calculation module are implemented.

In one embodiment, the load bearing platform 102 may track any interactions with the user. For example, the load bearing platform 102 may track any motions of the load bearing platform 102, jostling of the load bearing platform, placement of materials on the load bearing platform 102, or removal of materials from the load bearing platform 102. In order to implement the tracking, the load bearing platform 102 may utilize motion sensors, accelerometers, gyroscopes, location sensor, vibration sensors, or any other suitable sensor means.

In one embodiment, interactions with the user may trigger the load bearing platform 102 to awaken from sleep mode. In one embodiment, lack of interaction with the user (e.g., lack of interaction for 20 seconds) may cause the load bearing platform 102 to return to sleep mode.

In one embodiment, the load bearing platform 102 may track interactions so as to track probable usage of Gas. For example, if the detected quantity of a Gas canister is reduced after the load bearing platform 102 detects a removal and subsequent replacement of the container, then the load bearing platform 102 may infer that the Gas has been used. However, if the detected quantity of the Gas canister is reduced even in the absence of a detected interaction, then the load bearing platform 102 may determine that there is gas leakage, or that there is some source of measurement error. In the case of a determined gas leakage, the load bearing platform 102 may provide alert or other notification, such as sounding an alarm, displaying a message, transmitting a wireless signal, sending a text message, sending an email, alerting a fire department, or the load bearing platform 102 may take any other reactive measure. In the case of a determined measurement error, the load bearing platform 102 triggers the correction module 108 to compensate for the error causing parameters.

In one embodiment, the period of the quantity measurements taken may vary based on the amount of Gas remaining, based on the percent fullness of a canister, based on the detected weight of an object, or based on any other factor. In other embodiments, a frequency of measurements taken may vary as follows:
- if a canister is greater than 25% full, then measurements are taken only when the user presses a button;
- if a canister is between 5% and 25% full, then measurements are taken every five minutes if a panel is plugged in (e.g., if a display panel is plugged in);
- if a canister is less than 5% full, then measurements are taken every minute if a panel is plugged in. For example, the user may receive a more granular updates as to the quantity of Gas remaining as the user gets closer to running out of Gas. The user may then be less likely to run out and be caught unawares.

As will be appreciated, various other methods may be used to vary the frequency of measurement. For example, other frequencies of measurement may be used, and other capacity thresholds may be used before changing from one frequency of measurement to another.

The apparatus 100 further comprises the interface 114 to allow a user to store pre-determined values in the memory 107. The predetermined values are used by the processor while measuring the quantity of the material.

Still referring to FIG. 3, the apparatus 100 and system 200 are provided with a power supply 130. The processor 106 is provided with a device input 138 to store data in the memory 107. The apparatus 100 and system 200 are provided with a speaker 136 to generate alarms and alerts. An antenna 134 works as the transreceiver 118. The display 132 displays the measurement of quantity of the material. Program 140 applies correction methodologies for temperature data 142, zero balance data 144 and creep data 146.

Referring to FIGS. 2(a), 2(b) and 2(c), in one embodiment, a system 200 for measuring a quantity of a material is provided. The quantity of the material is communicated to a server 122 in the network 201. The system 200 comprises a load bearing platform 102, sensors 104 and processor 106 coupled to the memory 107. The memory stores a correction module 108. The system 200 comprises a measurement device 110, output device 112, a user interface 114 and a battery optimization module 116. The system 200 further comprises a transceiver 118 configured to transmit the values associated with the quantity of the material to the server 122 in the network 201. The transceiver 118 is further configured to receive one or more informative message from the server 122 with respect to the values transmitted to the server, such that the informative message provides assistance in management of the material in the container.

The working and description of the load bearing platform 102, the sensors 104, the processor 106, the measurement device 110, the output device 112, the user interface 114 and the battery optimization module 116 is similar to as described for apparatus 100.

The transceiver 118 further communicates with the server 122 by means of a Bluetooth, a wifi, an ethernet port, any wireless communication module, any wired communication module, or a combination thereof. Further, the transceiver 118 communicates with the server through a communication device 120 by using a short range communication protocol by using a customized application to be used in android, smart phones etc. The communication device 120 further comprises a smart phone, custom embedded electronics, and portable battery operated devices.

In one embodiment, the informative message that the transceiver 118 receives from the server 122 may comprises a message regarding refilling of the material in the container, regarding change or maintenance of the container, regarding acknowledgment with respect to the user input, consumption of gas for a given size of the family, consumption of the gas for a season, consumption of gas for a specific geography, consumption to be tracked for hours or time of the day, or a combination thereof. The informative message may be further communicated over telecommunication network like telephony, mobile networks etc.

In one embodiment, the communication device 120 may be a MODEM which receives the informative message from the server or any other device for either sending the data to server's, cloud storage of data, sending text messages to book the new cylinder, auto dial the gas agency to book the new gas cylinder etc.

Figure 4:
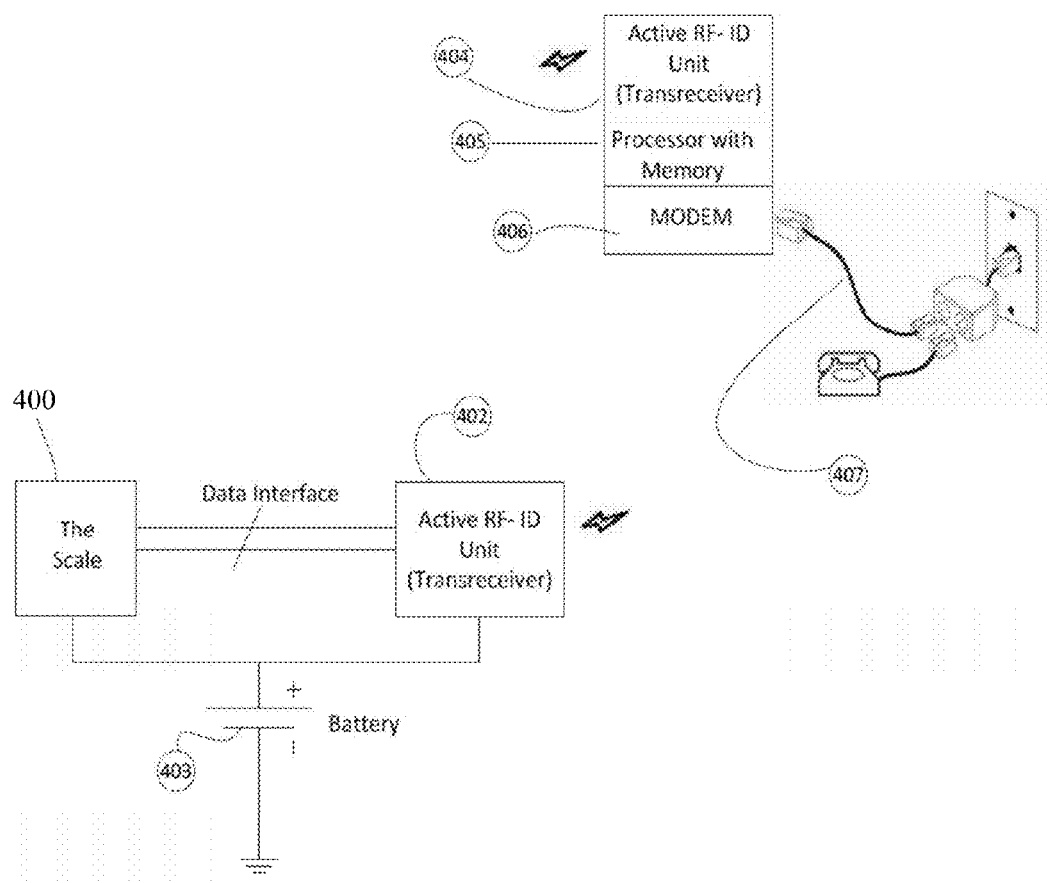
FIG. 4 illustrates a mechanism of measuring quantity of the material in accordance with some embodiments.

Referring to FIG. 4, in accordance with an exemplary embodiment, the scale 400 through the data interface transmits the measurement of the material to an active RF-ID Unit Transceiver 402. The processor 405 is used to compensate errors. Through a modem 406, the measurement of material is transmitted to a communication device 407 for further management of fuel. The communication device 407 transmits the message to one or more server for receiving informative messages.

Figure 5:
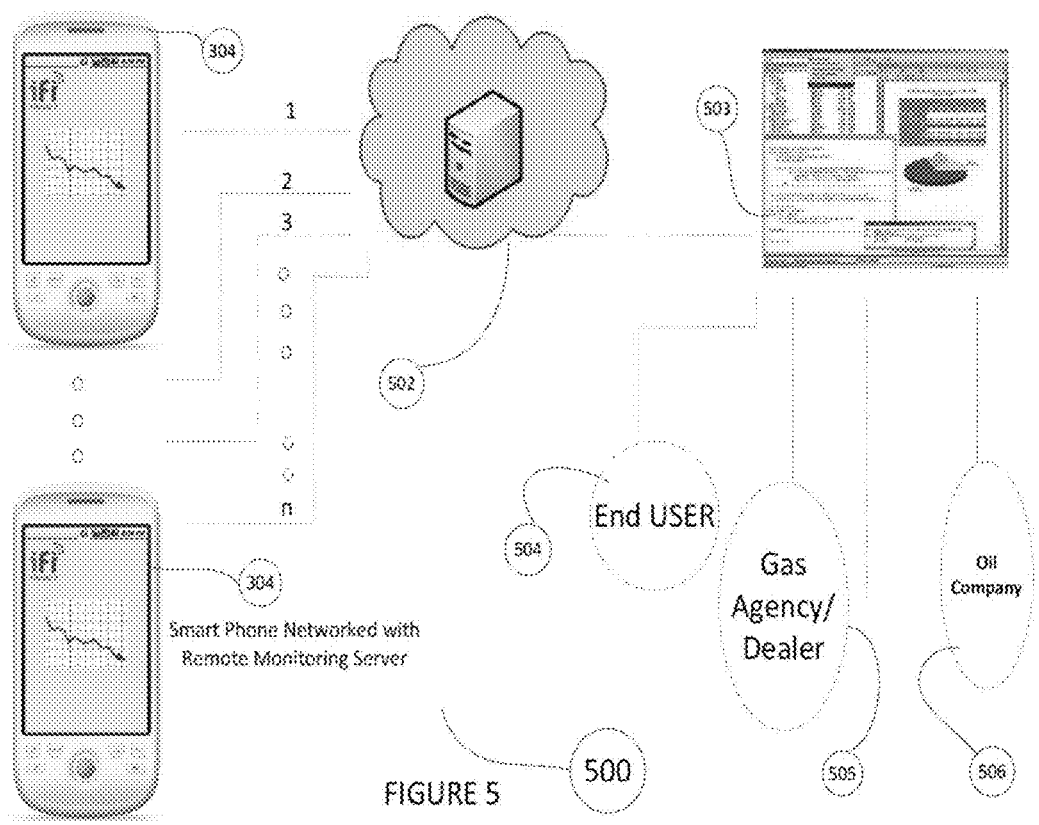
FIG. 5 illustrates a communication of values with the server in accordance with some embodiments.

Referring to FIG. 5, in one embodiment, according to method 500, the load bearing platform 202 may comprises the server 502 connected to the Smartphone for data acquisition and data analytics. The server 502 may be cloud based server or an independent server. The server 502 may receive information of Gas container users using Smartphone as in drawing 304. The server 502 may transmit the information to the users by sending data to the Smart phone using wireless technologies like GPRS, 3G, 4G, Wi-Fi or a combination thereof. The server 502 may consist of interface to the user 504, Dealer 505 and Oil/Gas Company 506.

The server 502 may provide web services like email services and user registration. The server 502 may consist of data bases such as MYSQL, SQL or any other database. Further, the server may consist of services of Apace, Tomcat, JDK or any other services. The services may be hosted on an individual server or Cloud based server. The server may have the user interface based on HTML, XHTML or any other languages for viewing the information on a webpage. The Users may register on the webpage with unique user id and password by using the smart phone 304 networked with remote monitoring server. Various trends may be displayed by an application 503 on display of server 502. The application 503 may be used to connect to end user 504, gas agency 505 or Oil Company 506.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented in the above described media system 102.

Figure 6:
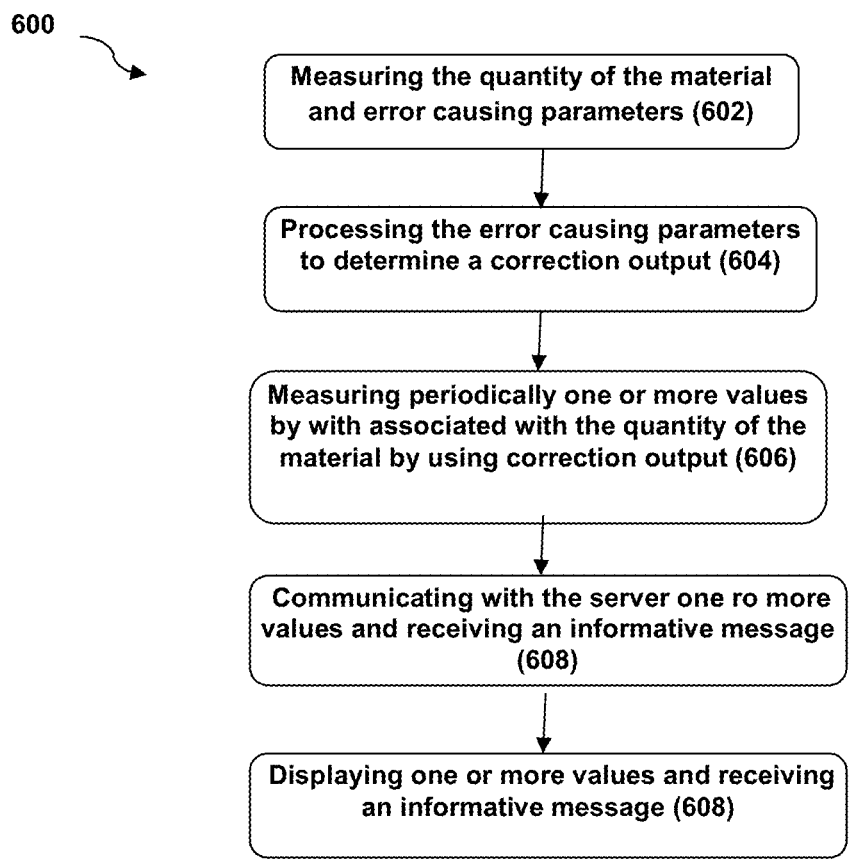
FIG. 6 illustrates a method of measuring quantity of the material and sharing the quantity of the server in accordance with some embodiments.

At block 602, the quantity of the material and one or more error causing parameters in the measurement of the material are measures as shown FIG. 6.

At block 604, one or more correction methodologies are executed with respect to the error causing parameters to determine a correction output. The correction methodology determines a variance caused due to the error causing parameter in the measurement of the quantity of the material.

At block 606, measuring periodically one or more values associated with the quantity of the material by using the correction output.

At block 608, communicating with the server to transmit one or more values associated with the quantity of the material and to receive one or more informative message from the server with respect to the values so transmitted to the server. The one or more values and informative message are then displayed to the user.

The foregoing embodiments are not intended to be exhaustive or to limit the disclosure to the precise forms disclosed, and modifications and variations are also contemplated as falling within the present scope.

Various embodiments may advantageously show trends on propane gas levels inside the cylinder so that a user can plan stock or arrange back-up or additional cylinder for uninterrupted use.

Various embodiments may advantageously show gas consumption patterns over period of time.

Various embodiments may advantageously show trends on daily consumption patterns.

Various embodiments may advantageously integrate software tools and advisory tips on how to use gas efficiently based on user patterns.

Various embodiments may advantageously show allow data collection on user locations, their lifestyles, their likings, shopping patterns etc.

Embodiments

The following are embodiments, not claims:

Z. An apparatus for measuring quantity of a material, the apparatus comprising:
   a load bearing platform to hold a container storing the material;
   at least one sensor coupled to the load bearing platform, configured to measure the quantity of the material and one or more error causing parameters;
   a processor in communication with the sensors, coupled to a memory, the processor configured to determine an effect of the error causing parameters while measuring the quantity of the material by executing one or more modules stored in the memory, the one or more modules further comprising:
   a correction module configured to execute one or more correction methodology with respect to the error causing parameters so measured, to determine a correction output, the correction methodology determines a variance caused due to the error causing parameter in the measurement of the quantity of the material;
   a measurement device configured to measure periodically one or more values associated with the quantity of the material by using the correction output; and
   an output device configured to display one or more values associated with the quantity of the material and to generate a notification for a user in a customized manner.

B. The apparatus of embodiment Z, wherein the material may include LPG (Liquid Petroleum Gas).

C. The apparatus of embodiment Z, wherein the sensors further comprises load sensor, pressure sensor, motion sensors, accelerometers, gyroscopes, location sensor, vibration sensor, or a combination thereof.

D. The apparatus of embodiment Z, wherein the error causing parameters further comprises a creep value, a zero balance factor, a temperature factor, a tank variance factor or a combination thereof.

E. The apparatus of embodiment Z further comprises a user interface configured to allow a user to store in the memory, one or more predetermined values affecting the measurement of the quantity of the material, the predetermined values to be used by the processor while determining the correction output.

F. The apparatus of embodiment Z, further comprises a battery optimization module to conserve the battery used to charge the apparatus.

G. The apparatus of embodiment Z, wherein the measurement device further comprises electronic components to convert electrical signals into weight of the material, the electronic components is selected from a group of a load cell, a strain gauge load cell, a hydraulic load cell, piezoelectric load cell, vibrating wire load cell, pressure gauge or a capacitive load cell.

H. The apparatus of embodiment Z, wherein the values associated with quantity of the material comprises weight readings of the material, estimates of an amount of material remaining, a material weight in percentage, a material weight in kgs, material weight in lbs, a graphic display of a container with the volume of the material left in the container or any other message.

I. The apparatus of embodiment Z, wherein the output device further displays one or more values in a form of a graphical representation to further generate notification in a form of an alarm or any light display, or a combination thereof.

J. A system for measuring a quantity of a material, the quantity of the material is further communicated to a server in a network, the system comprising:
a load bearing platform to hold a container storing the material;
at least one sensor coupled to the load bearing platform, configured to measure the quantity of the material and one or more error causing parameters in the measurement of the quantity of the material;
a processor in communication with at the sensors and coupled to a memory, the processor configured to determine an effect of the error causing parameters while measuring the quantity of the material by executing one or more modules stored in the memory, the one or more modules further comprising:
a correction module configured to execute one or more correction methodology with respect to the error causing parameters to determine a correction output, the correction methodology determines a variance caused due to the error causing parameter in the measurement of the quantity of the material;
a measurement device configured to measure periodically one or more values associated with the quantity of the material by using the correction output;
a transreceiver configured to transmit the values associated with the quantity of the material to the server in the network, the transreceiver is further configured to receive one or more informative message from the server with respect to the values transmitted to the server, such that the informative message provide assistance in management of the material in the container; and
an output device configured to display one or more values associated with the material and the informative message to generate a notification for a user in a customized manner.

K. The system of embodiment J, wherein the transreceiver further communicates with the server by means of a Bluetooth, a wifi, an ethernet port, any wireless communication module, any wired communication module, or a combination thereof.

L. The system of embodiment J, wherein the transreceiver communicates with the server through a communication device by using a short range communication protocol by using a customized application.

M. The system of embodiment L, wherein the communication device further comprises a smart phone, custom embedded electronics, portable battery operated devices.

N. The system of embodiment J, wherein the informative message further comprises a message regarding refilling of the material in the container, regarding change or maintenance of the container, regarding acknowledgement with respect to the user input, consumption of gas for a given size of the family, consumption of the gas for a season, consumption of gas for a specific geography, consumption to be tracked for hours or time of the day, or a combination thereof.

O. A method for measuring a quantity of a material, the quantity of the material is further communicated to a server in a network, the method comprising:
measuring the quantity of the material and one or more error causing parameters in the measurement of the material;
processing the error causing parameters to determine an effect of the error causing parameters while measuring the quantity of the material, the processing further comprising:
executing one or more correction methodology with respect to the error causing parameters to determine a correction output, the correction methodology determines a variance caused due to the error causing parameter in the measurement of the quantity of the material;
measuring periodically one or more values associated with the quantity of the material by using the correction output;
communicating with the server to transmit one or more values associated with the quantity of the material and to receive one or more informative message from the server with respect to the values so transmitted to the server, such that the informative message provide assistance in the management of the material in the container; and
displaying one or more values associated with the material and the informative message to a user in a customized manner.

P. The method of embodiment O, wherein the error causing parameters further comprises a creep value, a zero balance factor, a temperature factor, a tank variance factor or a combination thereof.

Q. The method of embodiment O, wherein the correction methodology with respect to a creep value obtained as the error causing parameter further comprises determining a trend in the measurement of the quantity of the material and interpolating a final creep value after a fixed period of time, the correction methodology with respect to a zero balance value obtained as the error causing parameter further comprises storing and retrieving a pre-determined calibration data to adjust the measured quantity of the material, the correction methodology with respect to a temperature value obtained as the error causing parameter further comprises adjusting the measured quantity of the material by executing one or more temperature and weight dependent formula, and the correction methodology with respect to a tank variance value obtained as the error causing parameter further comprises calculating a percent of the material and time remaining by using a default minimum tank weight.

R. The method of embodiment O, wherein measuring the quantity of the material further comprises converting electrical signals into the quantity of the material.

S. The method of embodiment O further comprises allowing a user to store in the memory, one or more predetermined values affecting the measurement of the quantity of the material, the predetermined values to be used by the processor while determining the correction output.

T. The method of embodiment O, wherein one or more values are illustrated the form of a graphical representation to further generate notification in the form of an alarm or any light display, or a combination thereof.

A. An apparatus comprising:
a load-bearing platform for holding a container with material;
a first sensor coupled to the platform, wherein the first sensor is configured to generate readings that vary with load placed on the platform;
a second sensor configured to measure an ambient condition;
a communications port;
a memory operable to store a set of computer instructions; and
a processor operable to execute the computer instructions to:
receive a first reading from the first sensor;

receive a second reading from the second sensor;
determine a first quantity of a first material that has been placed on the platform based on the first reading and based on the second reading; and
cause an indication of the first quantity to be transmitted to an external entity via the communications port.

E. The apparatus of embodiment A further comprising a user interface configured to allow a user to store in the memory, one or more predetermined values affecting the determination of the first quantity; in which, in determining the first quantity, the processor is operable to determine the first quantity of the first material based on the first reading, the second reading, and the one or more predetermined values.

F. The apparatus of embodiment A, further comprising:
a battery; and
a battery optimization module to conserve the battery used to charge the apparatus.

G. The apparatus of embodiment A, wherein the first sensor is one of: a load cell, a strain gauge load cell, a hydraulic load cell, a piezoelectric load cell, a vibrating wire load cell, a pressure gauge, and a capacitive load cell.

A.5 The apparatus of embodiment A further including guard members configured to hold in place on the platform a container of liquid or gaseous fuel.

A.0 The apparatus of embodiment A in which the second reading is one of: (a) a creep value; (b) a zero-balance factor; (c) a temperature factor; and (d) a tank variance factor.

A.4 The apparatus of embodiment A in which, in determining the first quantity of the first material, the processor is further operable to:
determine a tentative quantity based on the first reading;
determine an error based on the second reading; and
adjust the tentative quantity by the amount of the error in order to arrive at the first quantity.

A.4.1 The apparatus of embodiment A.4 in which the memory stores a Calibration Temperature, in which the second reading is a temperature, and in which, in determining the error, the processor is operable to use the formula 0.25*F.S*(Current Temperature−Calibration Temperature)/10.

A.4.2 The apparatus of embodiment A.4 in which, in determining the error, the processor is operable to:
determine a trend in measurements of quantity of the material and interpolate a final creep value after a fixed period of time;
store and retrieve predetermined calibration data to adjust the determined first quantity of the material;
adjust the determined first quantity of the material by executing one or more temperature and weight dependent formulas; and
calculate a percent of the material and time remaining by using a predetermined minimum container weight.

A.6. The apparatus of embodiment A in which the external entity is one of: (a) a server; (b) a computing device; and (c) a person.

A.5. The apparatus of embodiment A in which the communications port is one of: (a) a wireless transceiver; (b) an ethernet port; (c) a cellular transceiver; (d) a Wi-Fi transceiver; and (e) a Bluetooth transceiver.

A.1 The apparatus of embodiment A where in the second sensor is configured to measure an ambient temperature.

A.2 The apparatus of embodiment A further comprising a display, in which the processor is further operable to cause the display to show the indication of the quantity.

A.6 The apparatus of embodiment A in which the processor is further operable to:
receive a third reading from the first sensor at a time later than a time of the first reading;
receive a fourth reading from the second sensor at a time later than a time of the second reading;
determine a second quantity of the first material based on the third reading and based on the fourth reading; and
cause an indication of the second quantity to be transmitted to an external entity via the communications port.

A.6.1 The apparatus of embodiment A.6, further comprising an output device, in which the processor is further operable to:
determine a difference between the second quantity and the first quantity;
determine a rate of material depletion based on the difference between the second quantity and the first quantity, and based on the elapsed time between the time of the third reading and the time of the first reading;
determine a fifth time at which the material will be fully depleted; and
cause an indication of the fifth time to be shown on the output device.

A.6.2. The apparatus of embodiment A.6, further comprising an output device, in which the processor is further operable to:
determine a difference between the second quantity and the first quantity;
determine a rate of material depletion based on the difference between the second quantity and the first quantity, and based on the elapsed time between the time of the third reading and the time of the first reading;
determine a fifth time at which the material will be fully depleted; and
cause the output device to broadcast an alert if the fifth time is within a predetermined time.

A.6.3. The apparatus of embodiment A.6, further comprising an output device, in which the processor is further operable to:
determine a difference between the second quantity and the first quantity;
determine a rate of material depletion based on the difference between the second quantity and the first quantity, and based on the elapsed time between the time of the third reading and the time of the first reading; and
cause the output device to display an informative message, the message including one of:
a suggestion to refill the container;
a suggestion to change the container;
a suggestion to perform maintenance on the container;
an indication of material consumption over time;
an indication of the rate of consumption of the material for a family;
an indication of consumption the material for a season;
an indication of consumption of the material for a specific geography;
an indication of when consumption of the material is being tracked.

The invention claimed is:
1. An apparatus comprising:
a load-bearing platform for holding a container with a material;

a first sensor coupled to the load-bearing platform, wherein the first sensor is configured to generate readings that vary with a load placed on the load-bearing platform;
a second sensor configured to measure an ambient condition;
a communications port;
a memory operable to store a set of computer instructions;
a processor operable to execute the set of computer instructions to:
  receive a first reading from the first sensor;
  receive a second reading from the second sensor;
  determine a first quantity of a first material that has been placed on the load-bearing platform based on the first reading and based on the second reading; and
  cause an indication of the first quantity to be transmitted to an external entity via the communications port,
a battery; and
a battery optimization module to conserve the battery used to charge the apparatus, the battery optimization module comprising a subset of the computer instructions,
in which the processor is further operable to execute the subset of the computer instructions to:
  receive a third set of reading from the first sensor spaced at a first frequency interval if the first quantity is above a predetermined threshold; and
  receive a fourth set of reading from the first sensor spaced at a second frequency interval if the first quantity is below the predetermined threshold, in which the second frequency is greater than the first frequency.

2. An apparatus comprising:
a load-bearing platform for holding a container with a material;
a first sensor coupled to the load-bearing platform, wherein the first sensor is configured to generate readings that vary with a load placed on the load-bearing platform;
a second sensor configured to measure an ambient condition;
a communications port;
a memory operable to store a set of computer instructions;
a processor operable to execute the set of computer instructions to:
  receive a first reading from the first sensor;
  receive a second reading from the second sensor;
  determine a first quantity of a first material that has been placed on the load-bearing platform based on the first reading and based on the second reading; and
  cause an indication of the first quantity to be transmitted to an external entity via the communications port, in which, in determining the first quantity of the first material, the processor is further operable to:
  determine a tentative quantity based on the first reading;
  determine an error based on the second reading; and
  adjust the tentative quantity by an amount of the error in order to arrive at the first quantity, in which, in determining the error, the processor is operable to:
  determine a trend in measurements of quantity of the first material and interpolate a final creep value after a fixed period of time;
  store and retrieve predetermined calibration data to adjust the determined first quantity of the first material;
  adjust the determined first quantity of the first material by executing one or more temperature and weight dependent formulas; and
  calculate a percent of the first material and time remaining by using a predetermined minimum container weight.

3. An apparatus comprising:
a load-bearing platform for holding a container with a material;
a first sensor coupled to the load-bearing platform, wherein the first sensor is configured to generate readings that vary with a load placed on the load-bearing platform;
a second sensor configured to measure an ambient condition;
a communications port;
a memory operable to store a set of computer instructions;
an output device; and
a processor operable to execute the set of computer instructions to:
  receive a first reading from the first sensor;
  receive a second reading from the second sensor;
  determine a first quantity of a first material that has been placed on the load-bearing platform based on the first reading and based on the second reading;
  cause an indication of the first quantity to be transmitted to an external entity via the communications port;
  receive a third reading from the first sensor at a time later than a time of the first reading;
  receive a fourth reading from the second sensor at a time later than a time of the second reading;
  determine a second quantity of the first material based on the third reading and based on the fourth reading;
  cause an indication of the second quantity to be transmitted to an external entity via the communications port;
determine a difference between the second quantity and the first quantity;
determine a rate of the first material depletion based on the difference between the second quantity and the first quantity, and based on an elapsed time between the time of the third reading and the time of the first reading;
determine a fifth time at which the first material will be fully depleted; and cause
an indication of the fifth time to be shown on the output device.

4. An apparatus comprising:
a load-bearing platform for holding a container with a material;
a first sensor coupled to the load-bearing platform, wherein the first sensor is configured to generate readings that vary with a load placed on the load-bearing platform;
a second sensor configured to measure an ambient condition;
a communications port;
a memory operable to store a set of computer instructions;
an output device; and
a processor operable to execute the set of computer instructions to:
  receive a first reading from the first sensor;
  receive a second reading from the second sensor;

determine a first quantity of a first material that has been placed on the load-bearing platform based on the first reading and based on the second reading;
cause an indication of the first quantity to be transmitted to an external entity via the communications port;
receive a third reading from the first sensor at a time later than a time of the first reading;
receive a fourth reading from the second sensor at a time later than a time of the second reading;
determine a second quantity of the first material based on the third reading and based on the fourth reading;
cause an indication of the second quantity to be transmitted to the external entity via the communications port;
determine a difference between the second quantity and the first quantity;
determine a rate of the first material depletion based on the difference between the second quantity and the first quantity, and based on an elapsed time between the time of the third reading and the time of the first reading;
determine a fifth time at which the first material will be fully depleted; and
cause the output device to broadcast an alert if the fifth time is within a predetermined time.

5. An apparatus comprising:
a load-bearing platform for holding a container with a material;
a first sensor coupled to the load-bearing platform, wherein the first sensor is configured to generate readings that vary with a load placed on the load-bearing platform;
a second sensor configured to measure an ambient condition;
a communications port;
a memory operable to store a set of computer instructions;
an output device; and
a processor operable to execute the set of computer instructions to:
receive a first reading from the first sensor;
receive a second reading from the second sensor;
determine a first quantity of a first material that has been placed on the load-bearing platform based on the first reading and based on the second reading;
cause an indication of the first quantity to be transmitted to an external entity via the communications port;
receive a third reading from the first sensor at a time later than a time of the first reading;
receive a fourth reading from the second sensor at a time later than a time of the second reading;
determine a second quantity of the first material based on the third reading and based on the fourth reading;
cause an indication of the second quantity to be transmitted to the external entity via the communications port;
determine a difference between the second quantity and the first quantity;
determine a rate of the first material depletion based on the difference between the second quantity and the first quantity, and based on an elapsed time between the time of the third reading and the time of the first reading; and
cause the output device to display an informative message, the informative message including one of:
a suggestion to refill the container;
a suggestion to change the container;
a suggestion to perform maintenance on the container;
an indication of the first material consumption over time;
an indication of a rate of consumption of the first material for a family;
an indication of consumption the first material for a season;
an indication of consumption of the first material for a specific geography;
an indication of when consumption of the first material is being tracked.

* * * * *